United States Patent
Beckmann et al.

(10) Patent No.: US 11,242,807 B2
(45) Date of Patent: Feb. 8, 2022

(54) METHOD FOR OPERATING A GAS TURBINE PLANT WITH GASEOUS FUEL

(71) Applicant: Siemens Energy Global GmbH & Co. KG, Munich (DE)

(72) Inventors: Björn Beckmann, Duisburg (DE); Niklas Nauber, Essen (DE); Maarten Over, Ratingen (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 17/257,578

(22) PCT Filed: May 16, 2019

(86) PCT No.: PCT/EP2019/062589
§ 371 (c)(1),
(2) Date: Jan. 3, 2021

(87) PCT Pub. No.: WO2020/011426
PCT Pub. Date: Jan. 16, 2020

(65) Prior Publication Data
US 2021/0246839 A1 Aug. 12, 2021

(30) Foreign Application Priority Data
Jul. 10, 2018 (EP) .................................. 8182564

(51) Int. Cl.
*F02C 9/28* (2006.01)
*F02C 7/224* (2006.01)
*F02C 9/32* (2006.01)

(52) U.S. Cl.
CPC ............... *F02C 9/28* (2013.01); *F02C 7/224* (2013.01); *F02C 9/32* (2013.01); *F05D 2270/20* (2013.01);
(Continued)

(58) Field of Classification Search
CPC ............. F02C 7/14; F02C 7/224; F02C 7/228
See application file for complete search history.

(56) References Cited

U.S. PATENT DOCUMENTS

2001/0022087 A1  9/2001  Kobayashi et al.
2007/0062200 A1  3/2007  Brautsch et al.
(Continued)

FOREIGN PATENT DOCUMENTS

CN        1221069 A   6/1999
CN      101606021 A   12/2009
(Continued)

OTHER PUBLICATIONS

PCT International Search Report and Written Opinion of International Searching Authority dated Sep. 11, 2019 corresponding to PCT International Application No. PCT/EP2019/062589 filed May 16, 2019.

*Primary Examiner* — Scott J Walthour
(74) *Attorney, Agent, or Firm* — Wolter Van Dyke Davis, PLLC

(57) ABSTRACT

A method for operating a gas turbine plant with gaseous fuel, which is conveyed to the gas turbine plant through a gas line, burnt in a combustion chamber and then supplied to a gas turbine. At least one valve for controlling the flow of the fuel to the combustion chamber is installed in the gas line, a critical opening position being defined for the valve. To provide an improved method for operating a gas turbine plant in which the power of the gas turbine plant is kept at a maximum for as long as possible in the event of insufficient pressure in the gas line, a temperature of the fuel in the gas line is reduced when the valve is about to exceed the critical opening position.

14 Claims, 1 Drawing Sheet

(52) U.S. Cl.
CPC .. *F05D 2270/301* (2013.01); *F05D 2270/303* (2013.01)

(56) References Cited

U.S. PATENT DOCUMENTS

| | | |
|---|---|---|
| 2009/0008474 A1 | 1/2009 | Miyake |
| 2010/0024430 A1 | 2/2010 | Hofmann |
| 2010/0307157 A1* | 12/2010 | Bilton .................. F02C 6/18 60/730 |
| 2013/0283811 A1 | 10/2013 | Potel et al. |
| 2014/0130477 A1* | 5/2014 | Chen .................. F23R 3/34 60/39.463 |
| 2016/0060554 A1* | 3/2016 | Taylor .................. F02C 9/40 60/780 |
| 2017/0058774 A1 | 3/2017 | Pickford |

FOREIGN PATENT DOCUMENTS

| | | |
|---|---|---|
| CN | 107178789 A | 9/2017 |
| EP | 1730444 B1 | 7/2009 |
| GB | 763448 A | 12/1956 |
| JP | 2000038929 A | 2/2000 |
| JP | 2008215646 A | 9/2008 |
| JP | 2013185454 A | 9/2013 |
| JP | 2013249755 A | 12/2013 |
| WO | 2017152845 A1 | 9/2017 |

\* cited by examiner

METHOD FOR OPERATING A GAS TURBINE PLANT WITH GASEOUS FUEL

CROSS REFERENCE TO RELATED APPLICATIONS

This application is the US National Stage of International Application No. PCT/EP2019/062589 filed 16 May 2019, and claims the benefit thereof. The International Application claims the benefit of European Application No. EP18182564 filed 10 Jul. 2018. All of the applications are incorporated by reference herein in their entirety.

FIELD OF INVENTION

The invention relates to a method for operating a gas turbine plant with gaseous fuel, which is transported through a gas line to the gas turbine plant, is burned in a combustion chamber and is subsequently supplied to a gas turbine. The invention also relates to a control device for carrying out the method, and to a gas turbine plant having such a control device.

BACKGROUND OF INVENTION

Gas turbine plants are generally supplied with natural gas, as fuel, via a gas line. Here, the optimum operation of the gas turbine plant is dependent on the quality of the fuel, the correct pressure and the correct temperature. A minimum required pressure, which is established as a precondition for the operation of the gas turbine plant and has to be ensured, likewise depends on various usage and environmental conditions, for example turbine load, ambient temperature, ambient pressure, gas composition, gas temperature, etc. The pressure in the gas line may not be sufficient, however, on account of various situations, for example due to pressure variations in the local gas network, failures in the lines to and in the gas turbine plant, failure of the gas compressor, if one is present, variations in the gas quality, pressure losses along the gas line system, increase in the firing power, etc. If the gas turbine combustion depends on the precise distribution of the mass flow of fuel to two or more stages (for example main burner and pilot burner), it is in this case no longer possible to guarantee stability of combustion in the aforementioned situations.

For ensuring that a supply pressure in a gas line is greater than the pressure in the combustion chamber, it is known from EP 1 730 444 B1 to reduce the fuel temperature. However, this is always realized in combination with further measures for restricting the power increase of the gas turbine, which have a higher priority than the reduction of the fuel temperature. The motivation here is to avoid, through stabilization of the fuel supply pressure, flashbacks, which jeopardize the operational safety of the entire fuel supply and can result in the gas turbine plant being down for a considerable period of time. The measures for power reduction and possibly gas temperature reduction are initiated in a manner dependent on established pressure curves or pressure characteristics. The pressure characteristics must be based on design calculations and/or empirical values of other machines. If the combustion chamber pressure, which is dependent on the power, is taken into account, then the gas pressure is an approximate measure of the maximum settable fuel volume flow. On account of calculation inaccuracies and natural variations from machine to machine (for example due to production tolerances) and also temporally variable pressure loss coefficients over the gas system and the burner (wear or fouling), the maximum settable fuel volume flow for a specific gas pressure is subject here to a certain degree of variation.

SUMMARY OF INVENTION

The invention is therefore based on the object of eliminating the disadvantages of the prior art and proposing an improved method for operating a gas turbine plant, in which, in the case of an insufficient pressure in the gas line, the power of the gas turbine plant is kept at a maximum for as long as possible.

The object is achieved according to the invention by a method for operating a gas turbine plant with gaseous fuel, which is transported through a gas line to the gas turbine plant, is burned in a combustion chamber and is subsequently supplied to a gas turbine, wherein at least one valve for regulating the throughflow of the fuel to the combustion chamber is installed in the gas line, wherein a critical opening position is defined for the valve, and if the valve is about to exceed the critical opening position, a temperature of the fuel in the gas line is reduced.

The object is further achieved according to the invention by a control device comprising means for carrying out a method of said type.

The object is lastly achieved according to the invention by a gas turbine plant having such a control device.

The advantages and embodiments stated below in connection with the method can be correspondingly transferred to the control device and to the gas turbine plant.

A valve refers here to any device for controlling or regulating the mass flow in the gas line. The valve is in particular able to completely shut off the gas line in the closed state, so that the gas flow is interrupted. The valve is advantageously designed as a control or regulating valve but may also be formed in the manner of a flap, a slide or a cock.

The invention is based on the realization that particularly reliable controllability of the gas turbine plant is achieved by virtue of the position of the throughflow valve being used as a criterion of when lowering of the fuel temperature is required. The position of the valve is a direct measure of the actually required pressure before the combustion chamber, or of the extent to which the fuel mass flow can still be increased as a reaction to insufficient pressure in the gas line. Here, the measures are applied only if this is actually necessary, and consequently the set target power of the gas turbine remains unchanged for as long as possible. By contrast to the prior art, the method is distinguished in particular in that it is load-independent, that is to say the position of the valve, correlated with the critical opening position, is a fixed criterion and is independent of the operating point.

The present position of the valve is known at all times since the mass flow in the gas line, a part of which is the valve, is known. In particular, the position of the valve is set in a manner dependent on the mass flow. The latter is measured directly or determined indirectly on the basis of various parameters. If the valve is in the critical opening position but the pressure in the gas line is insufficient, in particular since the requirements for the pressure increase or the pressure in the line drops, the lowering of the gas temperature is to be initiated as the first measure for maintaining the target power. The temperature of the fuel has a significant effect on the pressure in the gas line. The reduction of the gas temperature results in the density of the gas increasing, which leads to lower pressure losses in the fuel system.

Preferably, the critical opening position of the valve is in the range above 70% of the maximum opening position. The maximum opening position is the position in which the mass flow in the gas line is at its greatest. The decisive critical opening position of the valve is thus not necessarily the maximum open position of the valve (although it is also possible for the critical opening position to be defined by the maximum opening position too), but rather a position with slightly minimized throughflow. The advantage here is that reaction to rapid short-term changes to the operating parameters, such as for example fluctuations in the quality of the fuel, is possible by way of further opening of the valve. The critical opening position may also be adapted to the operating conditions retrospectively, by being changed during operation.

The reduction of the temperature of the fuel may be realized via active cooling measures. Preferably, however, the gas turbine plant has a preheating system for the fuel, and the temperature of the fuel in the gas line is reduced by reduction of the heat in the preheating system that is supplied to the fuel. This is a particularly simple and efficient procedure for lowering temperature, which requires no additional hardware and is not associated with any outlay in terms of energy.

According to an embodiment, a threshold value for the minimum temperature of the fuel is determined with account taken of an operating parameter of the gas turbine plant, and the reduction of the temperature of the fuel in the gas line is stopped if the threshold value has been reached. There may be potential restrictions in the gas turbine plant, so that compliance with a minimum gas temperature may be required. At low gas temperatures, there may arise for example problems in relation to stability of combustion and/or emissions. Such an operating parameter is for example the NOx value in the exhaust gas, which constitutes an additional criterion, on the basis of which a decision is made as to whether the method according to the invention is started or continued. Monitoring of a fixed minimum value of the temperature of the fuel may be provided for gases with increased proportions of higher hydrocarbons, since there is the risk of condensate formation at low gas temperature. At very cold locations, there is also the risk of icing at low gas temperature, and in this case a fixed minimum value of 5° C. has proven to be advantageous. Stopping of the reduction of the temperature of the fuel standardly refers here to an interruption to the process, if this has already been initiated. Alternatively, if the cooling of the fuel is not yet active and the threshold value for the emissions has already been reached, the gas cooling is omitted as long as the emission value corresponds to the threshold value.

Expediently, multiple valves are installed in the gas line, and use is made of the position of each of the valves. In the case of multi-stage burners, there are normally provided in the lines to the individual stages, for example to the main burner and pilot burner, in each case one valve for throughflow regulation. If at least one of the valves is in the critical opening position and can no longer react to continually growing mass flow requirements, the temperature of the fuel in the gas line, as already explained, is reduced.

In the cases in which variations in the gas quality are the cause of the insufficient pressure in the gas line, the lowering of the fuel temperature will generally be sufficient. If, however, the pressure requirement cannot be satisfied through the reduction of the fuel temperature, advantageously a turbine power is additionally reduced. The turbine power is lowered in a regulated manner, in particular in that a reduced power target value is predefined, only if the pressure requirements, with critical opening position of the valve reached, cannot be satisfied despite a reduction of the temperature. In emergencies, a gas turbine shutdown may even be carried out. Here, both measures, the lowering of the gas temperature and the power reduction, are intended to be combined with one another in such a way that the power remains unchanged, or as high as possible, for as long as possible, wherein it needs to be ensured at all times that the valve does not exceed the critical opening position. Of importance here is the prioritization of the two measures, that is to say they are possibly initiated at the same time, but the turbine power is raised again as soon as possible. A reduction of the turbine power is initiated in particular as a rapid reaction to a particularly large pressure gradient, if the reduction of the fuel temperature alone is not sufficient to counteract the pressure gradient.

BRIEF DESCRIPTION OF THE DRAWINGS

An exemplary embodiment of the invention will be discussed in more detail on the basis of a drawing. In the figures.

DETAILED DESCRIPTION OF INVENTION

Identical reference signs have identical meanings in the figures.

Figure 1:
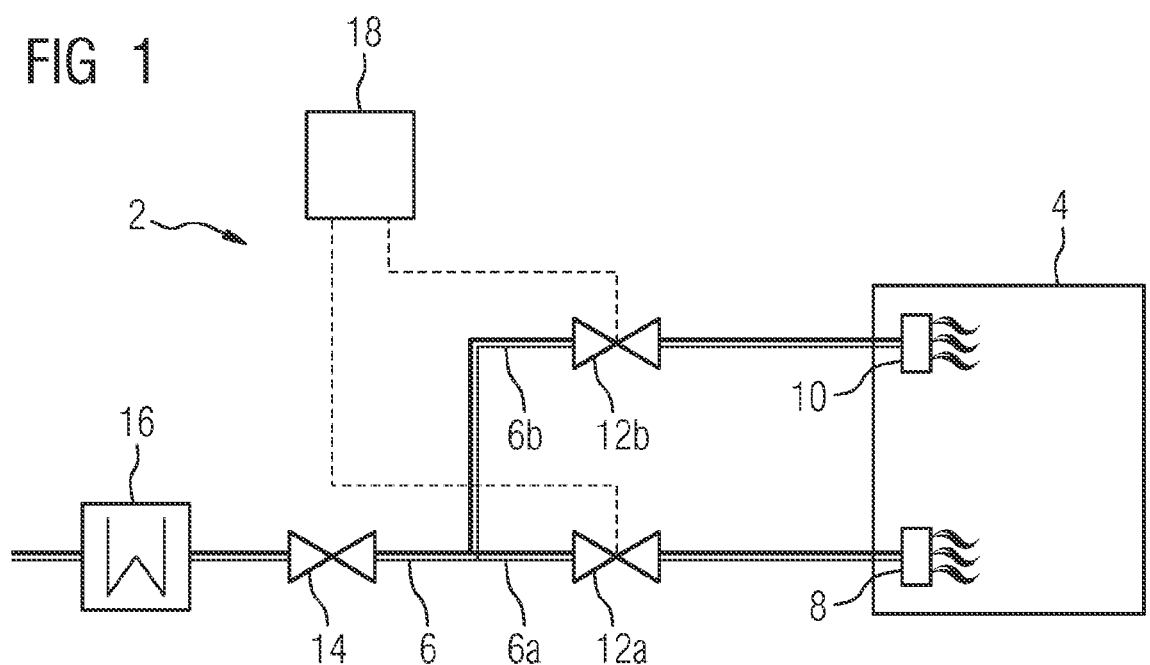
FIG. 1 shows, schematically and in a highly simplified form, a fuel system of a gas turbine plant.

FIG. 1 schematically shows the structure of a fuel system 2 which is part of a gas turbine plant (not shown in more detail) in which natural gas is used as fuel. The gas turbine plant generally comprises a compressor, a combustion chamber 4 and a gas turbine, coupled to which, for example, is a generator for generating electricity.

The fuel system 2 comprises a gas line 6 via which gaseous fuel is supplied to the combustion chamber 4. In the combustion chamber 4, there are arranged in particular multiple burners, which, in the exemplary embodiment shown, are of a multi-stage design and which, in the figure, are illustrated symbolically by a main burner 8 and a pilot burner 10. A sub-line 6a, 6b, in which a respective regulating valve 12a, 12b is installed, is branched off to each of the burner stages 8, 10. The gas line 6 moreover contains an emergency valve 14. Upstream of the emergency valve 14, there is also arranged on the gas line 6 a heat exchanger 16, which is part of a preheating system, which serves for preheating the fuel in the gas line 6.

The gas turbine plant furthermore comprises a control or regulating device 18, which regulates inter alia the position of the regulating valves 12a, 12b. Here, there is stored in the regulating device 18 a critical opening position for the regulating valves 12a, 12b, which is for example 80% of a maximum opening position of the regulating valves 12a, 12b. The critical opening position may in this case for example also be 70%, 75%, 85%, 90%, 95% of the maximum opening position of the regulating valves 12a, 12b or correspond to the maximum opening position.

Figure 2:
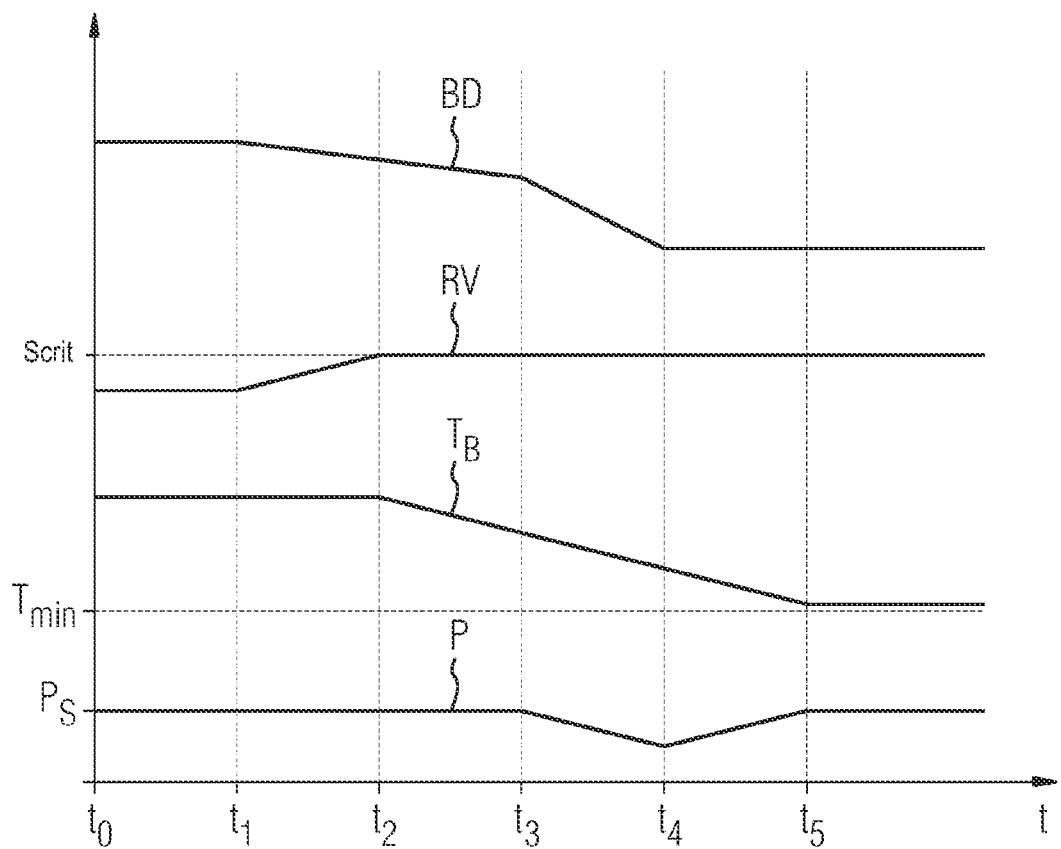
FIG. 2 shows, in a diagram, the temporal profile of various parameters of the gas turbine plant.

The course of the method according to the invention can be seen from FIG. 2. It is generally the case that the position of the respective regulating valve 12a, 12b is, via a regulating loop in the control or regulating device 18, always set in such a way that the gas turbine operates according to a predefined power or combustion temperature. It thus reacts indirectly automatically to variations in the following variables: natural gas supply pressure, natural gas temperature, natural gas quality, ambient conditions, pressure loss via the natural gas supply system and the burner (fouling/wear) and/or efficiency of the gas turbine (wear). All of these parameters constitute possible disturbance factors on the basis of which the position of the regulating valves 12a, 12b is regulated in order, in this way, to set in particular a turbine power P.

A decreasing fuel supply pressure BD (natural gas supply pressure in this case) is considered as a disturbance variable in FIG. 2. Instead of a decreasing natural gas pressure, it would alternatively be possible for use to be made of a deteriorating gas quality, a decreasing ambient temperature, an increasing ambient humidity, an increasing ambient pressure, fouling of a burner or natural gas system components, a reduced gas turbine efficiency, etc.

According to FIG. 2, from time $t_0$ to time $t_1$, the fuel supply pressure BD is constant and a regulating valve position RV is below a critical opening position $S_{crit}$. The fuel temperature $T_B$ and the turbine power P remain stable at their target value ($P_S$ for the turbine power).

From $t_1$ to $t_2$, the fuel supply pressure BD in the gas line 6 decreases. In order to keep the turbine power P (or the fuel mass flow) constant, the corresponding regulating valve or both regulating valves 12a, 12b are opened further until a critical opening position $S_{crit}$ has been reached.

In the time period from $t_2$ to $t_3$, the fuel supply pressure BD decreases further. The regulating valves 12a, 12b have reached their predefined critical opening position $S_{crit}$, and for this reason, from $t_3$, they are not opened further but remain at $S_{crit}$. In order to keep the power P (or the fuel mass flow) constant, the gas temperature $T_B$ is decreased.

From $t_3$, the fuel supply pressure BD decreases, with an even steeper gradient, further. The gradient is too large to be compensated by the slow changing of the fuel temperature $T_B$. The fuel temperature $T_B$ decreases further with its maximum gradient, the gas turbine power P additionally also being slightly reduced in order that the regulating valves 12a, 12b continue to be held in the critical opening position $S_{crit}$.

Between $t_4$ and $t_5$, the fuel supply pressure BD is stabilized to a lower level than the original one. The regulating valves 12a, 12b are still in the critical opening position $S_{crit}$. Since $t_3$, the turbine power P has constantly been below the power target valve $P_S$, but, in parallel to the progressive reduction of the fuel temperature $T_B$, the gas turbine power P is raised slowly to the target value $P_S$ again. Here, it needs to be ensured that the fuel temperature $T_B$ remains above a minimum threshold value $T_{min}$, wherein the threshold value $T_{min}$ correlates for example with the NOx emissions or some other operating parameter of the gas turbine plant.

From $t_5$, stable operation is achieved once again. The gas turbine power P has reached its target value $P_S$ again, and the gas turbine is operated further at reduced fuel temperature $T_B$. The fuel temperature $T_B$ is raised again only when the regulating valves 12a, 12b assume a position RV below the critical opening position $S_{crit}$ (this case not being shown).

The invention claimed is:

1. A method for operating a gas turbine plant with gaseous fuel, which is transported through a gas line to the gas turbine plant, is burned in a combustion chamber and is subsequently supplied to a gas turbine, wherein at least one valve for regulating the throughflow of the gaseous fuel to the combustion chamber is installed in the gas line, the method comprising:
   defining a critical opening position ($S_{crit}$) for the at least one valve;
   operating the gas turbine plant such that a power of the gas turbine plant is substantially constant at a target value;
   opening the at least one valve to the critical opening position ($S_{crit}$); and
   reducing a temperature ($T_B$) of the gaseous fuel in the gas line, based on the at least one valve having reached the critical opening position ($S_{crit}$), while maintaining operation of the gas turbine plant such that the power of the gas turbine plant is substantially constant at the target value over a first time period.

2. The method as claimed in claim 1, wherein the critical opening position ($S_{crit}$) of the at least one valve is above 70% of a maximum opening position.

3. The method as claimed in claim 1,
   wherein the gas turbine plant has a preheating system for the fuel, and the temperature ($T_B$) of the gaseous fuel in the gas line is reduced by reducing an amount of heat supplied to the gaseous fuel by the preheating system.

4. The method as claimed in claim 1,
   wherein a threshold value ($T_{min}$) for a minimum temperature ($T_B$) of the gaseous fuel is determined with account taken of a present value for an operating parameter of the gas turbine plant, and the reduction of the temperature ($T_B$) of the gaseous fuel in the gas line is stopped if the threshold value has been reached.

5. The method as claimed in claim 1, wherein the at least one valve comprises multiple valves.

6. The method as claimed in claim 1, wherein subsequent to maintaining operation of the gas turbine plant such that the power of the gas turbine plant is substantially constant at the target value over the first time period, the power of the gas turbine plant is reduced.

7. A control device for operating a gas turbine plant with gaseous fuel, which is transported through a gas line to the gas turbine plant, is burned in a combustion chamber and is subsequently supplied to a gas turbine, wherein at least one valve for regulating the throughflow of the gaseous fuel to the combustion chamber is installed in the gas line, the control device adapted to:
   store a predefined critical opening position ($S_{crit}$) for the at least one valve;
   operate the gas turbine plant such that a power of the gas turbine plant is substantially constant at a target value;
   open the at least one valve to the predefined critical opening position ($S_{crit}$);
   control a heat exchanger to reduce a temperature ($T_B$) of the gaseous fuel if the at least one valve reaches the predefined critical opening position ($S_{crit}$); and
   maintain operation of the gas turbine plant such that the power of the gas turbine plant is substantially constant at the target value while controlling the heat exchanger to reduce the temperature ($T_B$) of the gaseous fuel in the gas line.

8. A gas turbine plant comprising the control device of claim 7.

9. The method as claimed in claim 1, wherein the reducing step is performed based on a disturbance in a pressure of the gaseous fuel in the gas line.

10. The method as claimed in claim 1, wherein the critical opening position is a fixed position and is less than a maximum open position of the at least one valve.

11. The method as claimed in claim 1, wherein the reducing step is performed over the first time period based on a first disturbance in a pressure of the gaseous fuel in the gas line over the first time period; and wherein the power of the gas turbine plant is reduced from the target value over a second time period after the first time period based on a continued disturbance in the pressure of the gaseous fuel in the gas line over the second time period to maintain the at least one valve at the critical opening position.

12. The method as claimed in claim 11, wherein the power of the gas turbine plant is increased over a third time period after the second time period based on the pressure of the gaseous fuel in the gas line stabilizing over the third time period.

13. The method as claimed in claim 12, wherein the at least one valve is maintained at the critical opening position ($S_{crit}$) during the first time period, the second time period and the third time period.

14. The method as claimed in claim 1, wherein the at least one valve is maintained at the critical opening position ($S_{crit}$) during the reducing step.

* * * * *